Figure 1:
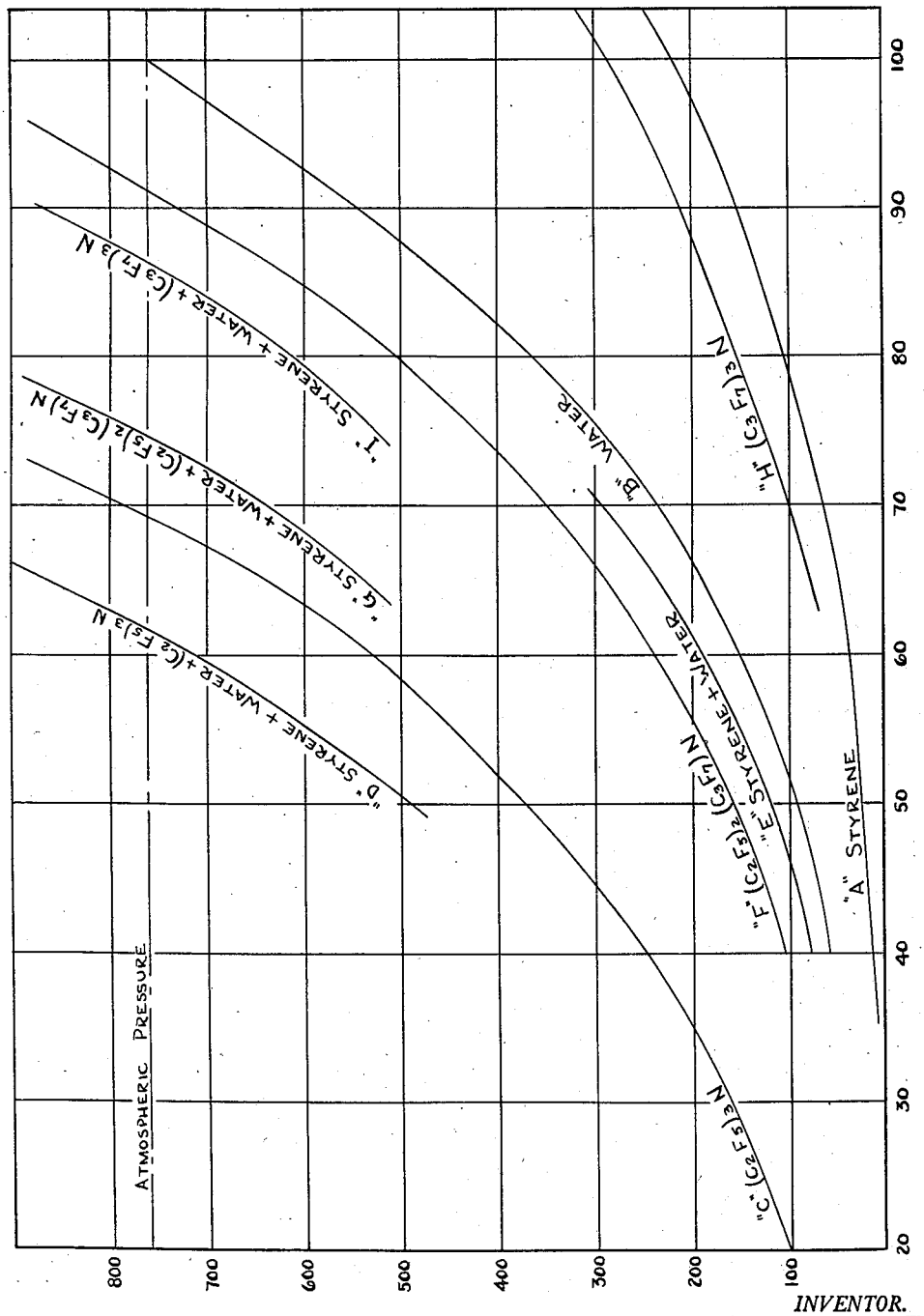

Feb. 4, 1958     G. CRANE     2,822,356
STRIPPING SYNTHETIC POLYMER REACTION MASSES
Filed Oct. 28, 1953     2 Sheets-Sheet 1

INVENTOR.
GRANT CRANE
BY W. A. Fraser
ATTY-

Feb. 4, 1958        G. CRANE        2,822,356
STRIPPING SYNTHETIC POLYMER REACTION MASSES
Filed Oct. 28, 1953

INVENTOR.
GRANT CRANE
BY
W. A. Fraser
ATTY

United States Patent Office 2,822,356
Patented Feb. 4, 1958

2,822,356

STRIPPING SYNTHETIC POLYMER REACTION MASSES

Grant Crane, Akron, Ohio, assignor to The Firestone Tire & Rubber Company, Akron, Ohio, a corporation of Ohio Application October 28, 1953, Serial No. 388,892

12 Claims. (Cl. 260—93.5)

This invention relates to the stripping of excess monomers from aqueous emulsion and suspension polymerization masses.

At the close of emulsion and suspension polymerization reactions, there usually remain considerable quantities of monomeric materials still unpolymerized in the reaction masses. In some cases, this may result from a deliberate termination of the reaction, as for instance by addition of a short-stopping agent; or else it may result from a dying out of the reaction, due to the exhaustion of the catalyst and/or concentration of inhibiting impurities in the unpolymerized monomeric materials. In any case, it is necessary to remove the unreacted monomers, both to avoid unhealthful and noxious odors, and to prevent undesired after-changes in the products. Such removal is usually effected by subjecting the polymerization mass to heat and low pressures in order to strip the unreacted monomers from the reaction mass. However, the polymerization product is usually somewhat sensitive to heat, so that the temperature and duration of the stripping step must be carefully limited. In many cases, therefore, it is impossible to strip the monomers from polymerization masses to a satisfactory degree. This is particularly the case with styrene polymers and copolymers, which must often be allowed to retain a considerable proportion of monomeric styrene, notwithstanding the resultant disagreeable odor.

Accordingly, it is an object of this invention to provide a novel and improved process for stripping excess monomers from emulsion and suspension polymerization masses.

Another object is to provide such a stripping process which may be carried out under relatively mild conditions of temperature and duration so as not to injure the polymerized product.

A further object is to provide such a process which will effect a substantially complete stripping of even relatively nonvolatile monomers.

A still further object is to provide such a process which will substantially completely remove the unpolymerized styrene from polymerized reaction masses.

A still further object is to provide a process for removing a portion of the water from aqueous emulsion and suspension polymerization masses in order to concentrate the same.

Still another object is to provide such a process which may be carried out expeditiously, and by the use of existing and inexpensive equipment and materials.

Figure 2:
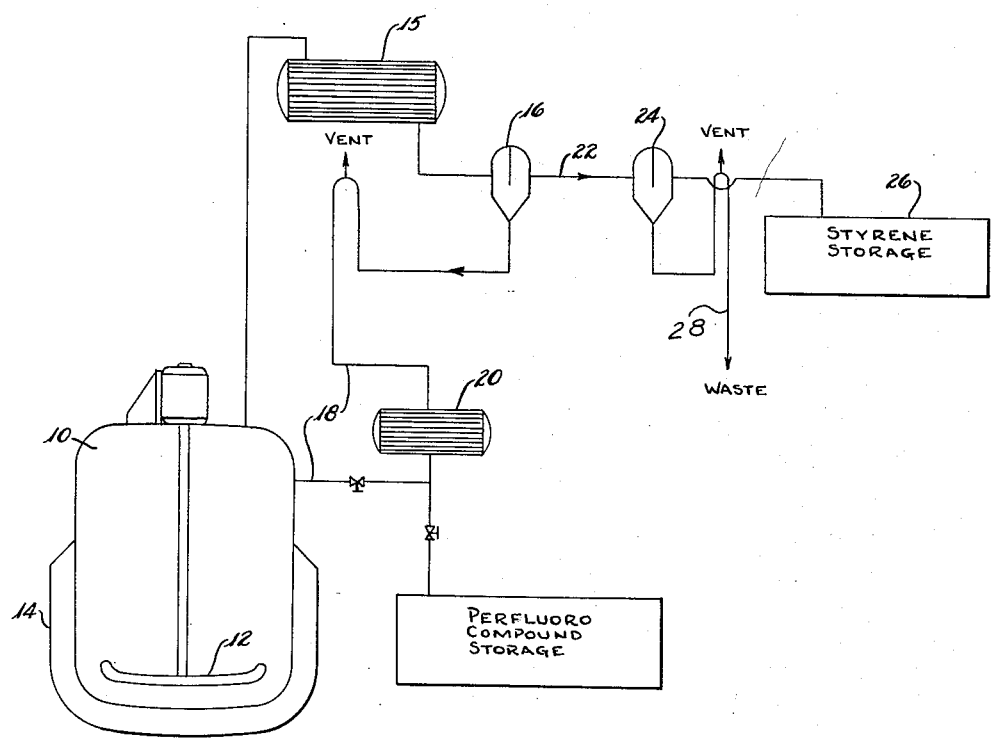

The invention will be described in connection with the accompanying drawings, wherein:

Fig. 1 is a graph showing the vapor pressure and boiling points of mixtures employed in the invention, and Fig. 2 is a diagram of an apparatus suitable for use in this invention.

SYNOPSIS OF THE INVENTION

The above and other objects are secured, in accordance with this invention, by the addition, to an emulsion or suspension polymerization mass, of a volatile perfluoro organic compound which is mutually insoluble with any of the other phases present, viz., the aqueous phase, the unreacted monomeric material, and the polymeric product. A relatively moderate degree of heat, together with vacuum if desired, is then applied to cause the reaction mass to boil, stripping off the monomeric materials. At the same time a considerable amount of water is removed, thus concentrating the polymerization mass. As will be explained more fully hereinbelow, a much lower degree of heat is required to effect this boiling than would be the case with a conventional stripping operation not using the perfluoro compounds as in this invention; and the stripping may be carried out for a much longer duration of time without injury to the polymeric product, so as to remove the monomeric materials far more completely than is possible with conventional stripping processes.

THE PERFLUORO COMPOUNDS

The perfluoro organic compounds employed in this invention have the unique property of being mutually insoluble with any compounds other than compounds of the same type, i. e., other perfluoro organic compounds. Specifically, they do not dissolve to any appreciable extent, and are not dissolved to any appreciable extent, by the aqueous phase, the monomeric substances or the polymeric materials present in the reaction mass to be stripped. As a result, each of the several phases present, viz., the aqueous phase, the monomeric material, and the perfluoro compound, exerts its vapor pressure independently of the other, with the consequence that the total vapor pressure generated by the reaction mass is much greater at any given temperature than the vapor pressure of any of the individual constituents. A consequence of this is that the reaction mass to which the perfluoro compound is added in accordance with this invention has a much lower boiling point than that of any of its individual phases; and specifically, has a much lower boiling point than a corresponding reaction mass not containing the perfluoro compound. This lowered boiling point enables the stripping operation to be carried out at a much lower temperature than would otherwise be possible, so that the operation may be prolonged so as to completely remove the monomers, without, however, degrading the polymeric product.

The foregoing discussion is illustrated in the graph of Fig. 1 for systems containing (I) water plus (II) styrene plus (III) various perfluoro compounds as indicated. In the graph, each curve is labelled with the designation of a substance, and the ordinates of the curve represent the vapor pressures of that substance at temperatures represented by the abscissas of the curve. Thus the curves A, B, and C show the temperature-vapor pressure relationships of styrene, water and triperfluoroethyl amine respectively. If these three substances are mixed together, they remain as separate phases which do not appreciably dissolve each other, so that the partial vapor pressure exerted by each phase is substantially undiminished from that of the pure compound constituting that phase. The total vapor pressure of the mixture is therefore the sum of the individual vapor pressures of the separate pure substances; and this total vapor pressure is represented by curve D, the ordinates of which are the sums of the ordinates of the curves A, B, and C. The boiling point of the mixture is determined by the point at which the ordinate of the curve D becomes equal to atmospheric pressure, i. e., 760 millimeters; and it will be seen that this boiling point is much lower than that of styrene (curve A), water (curve B) or a mixture of these two (curve E). In the discussion it was assumed that the boiling point is that at atmospheric pressure; but it will be seen that the curve D lies entirely above curves A, B, C, and E, so that, regardless of the pressure (whether sub- or super-atmospheric) under which the boiling point is determined, the boiling point will be greatly lowered by the addition of the perfluoro compounds of this invention.

Similar curves have also been drawn on the graph of Fig. 1 for the vapor pressure of di(perfluoroethyl)perfluoro (n-propyl) amine (curve F, the pure amine; curve G, the mixture of water plus styrene plus amine) and for the vapor pressure of perfluoro(n-propyl) amine (curve H, the pure amine; curve I, the mixture of water plus styrene plus perfluoro amine). In all cases it will be apparent that the boiling point is greatly lowered by the addition of the perfluoro compounds.

With regard to the perfluoro compounds employed, these may be any organic compounds (A) in which all of the carbon-bonded hydrogen atoms have been replaced by fluorine atoms and (B) which have a sufficient degree of volatility (boiling, say, in the range 50°–200° C.) to materially lower the boiling points of the reaction masses into which they may be incorporated. Thus the perfluoro compounds may be simple fluorocarbons on the order of perfluorohexane, perfluorocyclohexane, perfluorooctane, or the like. Likewise, there may be employed perfluoro compounds containing functional groups such as amine, ether and like groups provided that these groups are not such as to render the compound water soluble or react with any of the components present in the polymerization mass. Such compounds in many cases are cheaper than the fluorocarbons. Suitable perfluoro organic compounds containing functional groups include for instance diperfluorobutyl ether, diperfluorohexyl ether, triperfluoroethyl amine, di(perfluoroethyl)perfluoropropyl amine, triperfluoropropyl amine, tri(perfluorocyclohexyl) amine, and the like.

With regard to the quantity of the perfluoro organic compounds to be maintained in the stripping apparatus in accordance with this invention, the theoretical minimum quantity would be the amount required to provide vapor sufficient to occupy the vapor spaces in the equipment (both the free space in the equipment above the mass to be stripped and also the space occupied by the bubbles in the mass) at the partial pressure which the perfluoro compound is to exert under the steady-state conditions of operation contemplated. Also, an allowance should be made in this theortical minimum for the slight amount of the perfluoro compound which dissolves in the other phases. In addition to this minimum quantity, there should preferably be employed a small extra quantity of perfluoro compound, both to serve as a reservoir against fluctuating conditions, and also to allow for the necessary diffusional processes. As a rough rule, it will be preferred to maintain in the system a minimum of about 10% of the perfluoro compound, based on the weight of the polymerization mass plus perfluoro compound. There is of course no theoretical maximum; but quantities of perfluoro compounds substantially greater than the necessary minimum serve no useful function and, if carried to extremes, are wasteful.

Most conveniently, the process is carried out by boiling the polymerization mass in a closed vessel, condensing the vapors, separating the perfluoro compound from the condensate, and recycling the perfluoro compound back to the polymerization mass, all of these operations being carried out simultaneously and continuously.

THE POLYMERIZATION MASSES TO BE STRIPPED

Emulsion and suspension polymerization reactions are carried out by emulsifying or suspending ethylenically unsaturated polymerizable monomeric compounds together with a suitable free-radical-generating polymerization initiator in an aqueous medium. The temperature is adjusted to a level sufficiently high to enable the reaction to proceed. The reaction is continued until it is deliberately arrested or until it spontaneously dies down, due to low monomer concentration, accumulation of inhibiting impurities, exhaustion of initiators, or any combination of these causes. There result aqueous latices or suspensions of the polymers, containing greater or less quantities of unpolymerized monomers which it is the function of the stripping step to remove. The process of this invention is applicable to the stripping out of any of the monomers customarily employed in the manufacture of resins. However, the invention has especial application and suitability in the stripping off of relatively non-volatile monomers which are tenaciously retained by polymerization masses such as styrene, the chlorinated styrenes such as o-, m- and p-chlorostyrene and the various di- and tri-chlorostyrenes; maleic esters, such as diethyl maleate, di-n-propyl maleate and di-n-butyl maleate; and acrylic compounds on the order of acrylonitrile, methacrylonitrile, methyl acrylate, ethyl acrylate, methyl methacrylate and the like. In addition to removing excess monomers, the process of this invention also removes non-polymerizable volatile components of a polymerization mass, such as the ethylbenzene which often occurs as an impurity in styrene.

With the foregoing general discussion in mind, there are given herewith detailed examples of the practice of this invention. All parts given are by weight.

Example 1

A. POLYMERIZATION

| | Parts |
|---|---|
| Potassium oleate | 5 |
| Potassium persulfate | 0.3 |
| Water | 200 |
| Styrene | 100 |

A closed reaction vessel having a heating and cooling jacket and an anchor-type stirrer was provided for the polymerization reaction. The ingredients in the above recipe were charged into the vessel at 25° C., and agitation commenced in order to effect solution thereof. The free space in the vessel was purged with nitrogen, the vessel sealed, and the temperature raised to 50° C. At the end of two hours, the polymerization was stopped by addition of .2 part of dinitrophenylpyridinium chloride and 0.2 part of hydroquinone. There resulted a latex of polystyrene containing 28% of monomeric styrene, based on the weight of monomeric styrene plus polystyrene in the latex.

B. STRIPPING

| | Parts |
|---|---|
| Polystyrene latex (prepared as above described) | 100 |
| Tri(perfluoroethyl) amine | 44 |

For this operation there was provided (Fig. 2) a closed distillation vessel 10 provided with an anchor stirrer 12, a steam jacket 14, an overhead condenser 15, a first continuous decanting trap 16, and a recycle line 18 from the high-density liquid discharge of the decanting trap back to the distillation vessel 10. A steam reheater 20 was provided in the recycle line to reheat the liquid returning from the decanting trap to the distillation vessel. The low-density liquid discharge 22 of the decanting trap 16 was connected to the inlet of a second decanting trap 24, the low-density discharge of which was connected to a styrene storage vessel 26.

In the operation described below, vapors of water, styrene and tri(perfluoroethyl) amine were evolved in the distillation vessel 10 and condensed in the condenser 15. The condensate, consisting of three immiscible phases consisting of these respective compounds passed to the first decanter 16, which discharged the heaviest phase [tri(perfluoroethyl) amine] through the recycle line 18 and reheater 20 to the distillation vessel 10 the water and styrene were discharged from the low-density liquid outlet 22 of the first decanter to the second decanter 24, from which latter the styrene was discharged from the low-density liquid outlet to a styrene storage vessel 26 and the water was discharged through the high-density liquid outlet 28 to waste. Throughout the operation, the vessel was in communication with the atmosphere through the condenser system, so that the operating pressure was substantially atmospheric at all times.

The latex and tri(perfluoroethyl) amine were charged into the distillation vessel, and steam was supplied to the jacket of the vessel, and to the reheater in the decanter return line. Slow stirring was commenced, and the temperature rose to 65° C., at which time the latex commenced to boil. The temperature gradually rose to 69° C., at which temperature a substantial flow of condensate from the condenser to the decanting trap was established, and there commenced a continuous recycle of the tri(perfluoroethyl) amine from the high-density discharge of the first decanting trap through the reheater 20, which raises its temperature to 60° C., to the distillation vessel. Styrene was discharged from the low-density outlet of the second decanter to styrene storage. Following are the operating conditions during the process.

TABLE I

| Time After Commencement of Heating (minutes) | Temperature of Latex in Distillation Vessel (° C.) | Cumulative Weight of— | |
|---|---|---|---|
| | | Styrene to Storage | Water to Waste |
| 0 | 25 | 0 | 0 |
| 20 | 65 | 0 | 0 |
| 30 | 69 | 0 | 0 |
| 40 | 71 | 0.5 | 2.0 |
| 50 | 72 | 2.9 | 5.4 |
| 60 | 72 | 3.0 | 8.0 |
| 70 | 72 | 5.0 | 12.0 |

At the end of 70 minutes the stripping appeared to be complete. The recycle of tri(perfluoroethyl) amine was diverted to storage, and steam injected into the latex in the distillation vessel in order to distill the tri(perfluoroethyl) amine out of the latex. Twenty three parts of the tri(perfluoroethyl) amine were recovered in this manner. Approximately 1.5 parts of the tri(perfluoroethyl) amine were dissolved in the recovered styrene, indicating a net loss of .5 part of the perfluoro compound.

*Example II*

| | Parts |
|---|---|
| Polystyrene latex (prepared as described in Example I, "A. Polymerization") | 250 |
| Water | 150 |
| Diperfluoroethyl perfluoro (n-propyl) amine | 177 |

The apparatus of Example I was employed also in the present example. The above materials were charged into the distillation vessel, steam supplied to the vessel jacket and to the reheater in the decanter return line, and stirring commenced. Following is a log of operating conditions during the run. Recycle of the perfluoroamine commenced when the temperature first reached 82° C. in the table below.

TABLE II

| Time After Commencement of Heating (minutes) | Temperature (° C.) | | Cumulative Weight of— | |
|---|---|---|---|---|
| | Latex in Distillation Vessel | Perfluoro-amine Entering Distillation Vessel from Recycle Line | Styrene to Storage | Water to Waste |
| 0 | 25 | | 0 | 0 |
| 15 | ¹82 | 147 | 0 | 0 |
| 30 | 85 | 140 | 10 | 65 |
| 45 | 79 | 132 | 12 | 90 |
| 60 | 82 | 186 | 17 | 150 |
| 90 | 82 | 190 | 17 | 205 |

¹ Active boiling and recycle of perfluoroamine through return line commenced at this point.

At the end of 90 minutes of the run, the di(perfluoroethyl) perfluoro(n-propyl) amine was diverted to storage, and steam injected into the latex in the distillation vessel to distill the amine out of the latex. 90 parts of the amine were recovered in this manner, and approximately 8 parts of the amine were dissolved in the recovered styrene, indicating a net loss of 2 parts of the amine in the cycle.

*Example III*

TABLE III

| | Grams | | |
|---|---|---|---|
| | Run No. 1 | Run No. 2 | Run No. 3 |
| Water | 100 | 100 | 100 |
| Potassium oleate | 2.5 | 2.5 | 2.5 |
| Potassium persulfate | 0.15 | 0.15 | 0.15 |
| Styrene | 50 | 50 | 50 |
| Tri (perfluoroethyl) amine | 0 | 1 | 0 |
| Di (perfluoroethyl) perfluoro (n-propyl) amine | 0 | 0 | 1 |
| Total solids at 24 hours (percent) | 34.3 | 35.2 | 32.5 |

The recycling, to the polymerization process, of the styrene recovered in the stripping operations above described, presents the possibility that the small amounts of perfluoro compounds entrained and dissolved with the styrene might interfere with the polymerization reaction. Accordingly, three polymerization batches were made up in accordance with the recipes of Table III, one free from any perfluoro amine, one containing tri(perfluoroethyl) amine and one containing di(perfluoroethyl) perfluoro-(n-propyl) amine. In each case the polymerization mixture was sealed in a beverage bottle and tumbled at 50° C. for 24 hours. At the end of this time, the total percentage of solids in each of the resultant latices was determined and is recorded in Table III. It will be seen that the presence of the perfluoro compounds did not affect the rates of polymerization.

From the foregoing general description and detailed specific examples, it will be evident that this invention provides a novel process for the effective and complete stripping of monomers from aqueous polymerization masses. The process may be carried out at very much lower temperatures than stripping processes heretofore in use, so that the polymeric products may be completely stripped without risking deterioration from heat conditions. The perfluoro compounds employed in the process are not unduly expensive and can, moreover, be almost quantitatively recovered.

What is claimed is:

1. Process of stripping unreacted monomers from a polymerization mass selected from the group consisting of aqueous emulsion and suspension polymerization masses which comprises mixing a perfluoro organic compound having a boiling point in the range 50°–200° C. with said mass, and subjecting the mixture to heat to cause boiling thereof.

2. Process of stripping unreacted monomers from an emulsion polymerization mass which comprises mixing with said mass a perfluoro organic compound having a boiling point in the range 50°–200° C. and heating the mixture to cause boiling thereof.

3. Process of removing unpolymerized styrene from a polymerization mass containing residual monomeric styrene and selected from the group consisting of aqueous emulsion and suspension polymerization masses, which comprises mixing with said mass a perfluoro organic compound having a boiling point in the range 50°–200° C. and subjecting the mass to heat to cause boiling thereof.

4. Process of removing unpolymerized styrene from an emulsion polymerization mass containing residual monomeric styrene which comprises mixing a perfluoro organic compound having a boiling point in the range 50°–200° C. with said polymerization mass and subjecting the mixture to heat to cause boiling thereof.

5. Process of stripping unreacted monomers from a polymerization mass selected from the group consisting of aqueous emulsion and suspension polymerization masses which comprises mixing perfluorotriethylamine with said mass and subjecting the mixture to heat to cause boiling thereof.

6. Process of stripping the unreacted monomers from an emulsion polymerization mass which comprises mixing with said mass perfluorotriethylamine and heating the mixture to cause boiling thereof.

7. Process of removing unpolymerized styrene from an emulsion polymerization mass containing residual monomeric styrene which comprises mixing perfluorotriethylamine with said polymerization mass and subjecting the mixture to heat to cause boiling thereof.

8. Process of stripping unreacted monomers from a polymerization mass selected from the group consisting of aqueous emulsion and suspension polymerization masses which comprises mixing di(perfluoroethyl)perfluoro(n-propyl) amine with said mass and subjecting the mixture to heat to cause boiling thereof.

9. Process of stripping the unreacted monomers from an emulsion polymerization mass which comprises mixing with said mass di(perfluoroethyl)perfluoro(n-propyl) amine and heating the mixture to cause boiling thereof.

10. Process of removing unpolymerized styrene from an emulsion polymerization mass containing residual monomeric styrene which comprises mixing di(perfluoroethyl)perfluoro(n-propyl) amine with said polymerization mass and subjecting the mixture to heat to cause boiling thereof.

11. Process of stripping unreacted monomers from a polymerization mass selected from the group consisting of aqueous emulsion and suspension polymerization masses which comprises mixing a perfluoro organic compound having a boiling point in the range 50°–200° C. with said mass and subjecting the mixture to heat to cause boiling thereof, condensing the vapors generated by the boiling, mechanically separating the perfluoro organic compound from the condensate and returning the perfluoro organic compound to the mixture being heated.

12. Process of stripping unreacted monomers from a polymerization mass selected from the group consisting of aqueous emulsion and suspension polymerization masses which comprises mixing a perfluoro organic compound having a boiling point in the range 50°–200° C. with said mass and subjecting the mixture to heat to cause boiling thereof, condensing the vapors generated by the boiling, mechanically separating the perfluoro organic compound from the condensate, heating the perfluoro organic compound and returning the perfluoro organic compound to the mixture being heated.

References Cited in the file of this patent

UNITED STATES PATENTS 2,433,060     Ohsol _____ Dec. 23, 1947

OTHER REFERENCES

Perry, "Chem. Eng's. Handbook," pp. 634, 643, 655, McGraw-Hill (1950).

Perry, "Chem. Eng's. Handbook," pp. 582, 630–634, 651–655.